DEPARTMENT OF COMMERCE
UNITED STATES PATENT AND TRADEMARK OFFICE

MISSING PAGE(S)

PATENT NUMBER 2,028,471 FOR THE ISSUE DATE 01/21/1936 HAS BEEN SCANNED/LOADED, BUT WITH MISSING PAGES(S). UPON RECEIPT OF THE MISSING PAGE(S), THE ENTIRE DOCUMENT WILL BE RESCANNED.

THIS NOTICE IS FOR THE MISSING PAGE(S) CONTAINING:

DRAWING 1

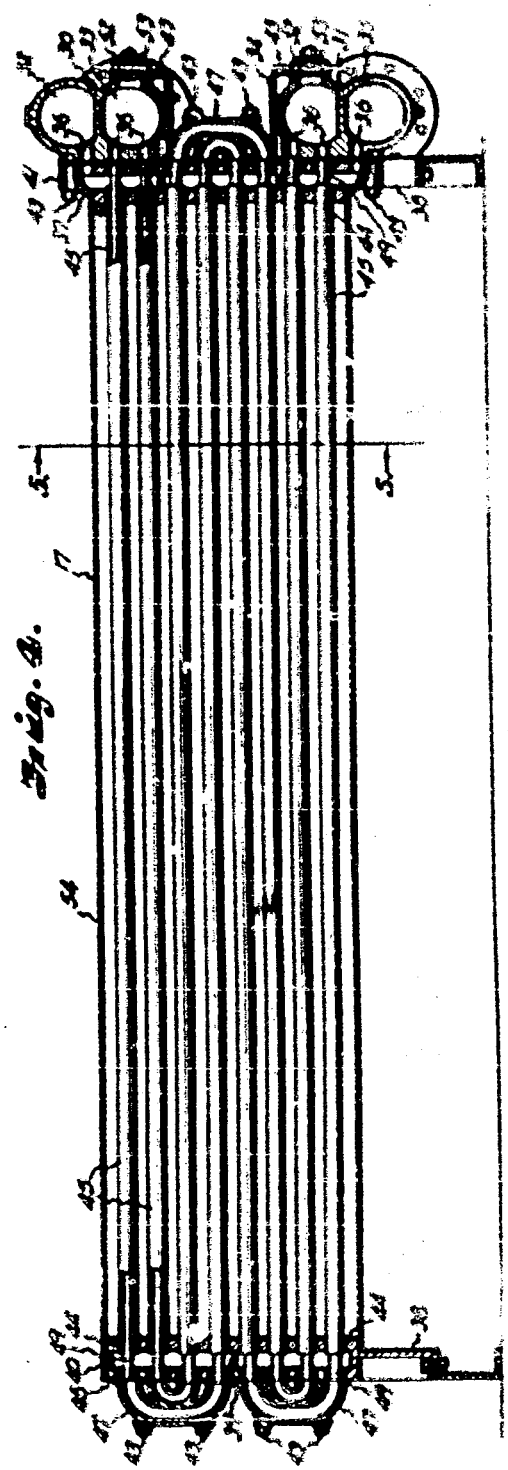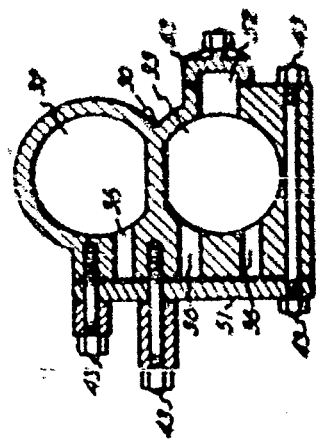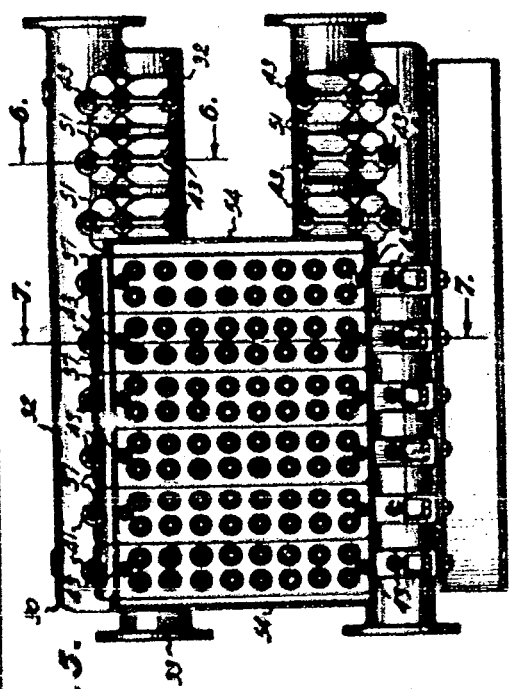

DEPARTMENT OF COMMERCE
UNITED STATES PATENT AND TRADEMARK OFFICE

---

MISSING PAGE(S)

PATENT NUMBER 2,028,471 FOR THE ISSUE DATE 01/21/1936 HAS BEEN SCANNED/LOADED, BUT WITH MISSING PAGES(S). UPON RECEIPT OF THE MISSING PAGE(S), THE ENTIRE DOCUMENT WILL BE RESCANNED.

THIS NOTICE IS FOR THE MISSING PAGE(S) CONTAINING:

DRAWING 3

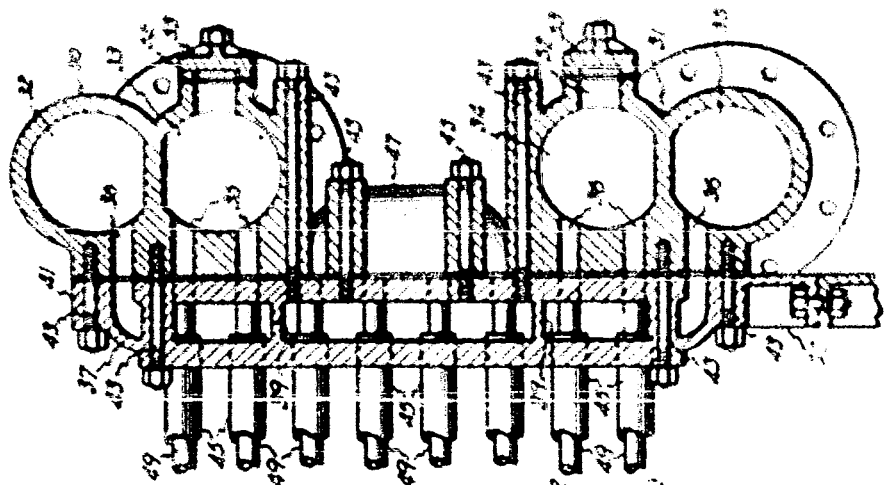
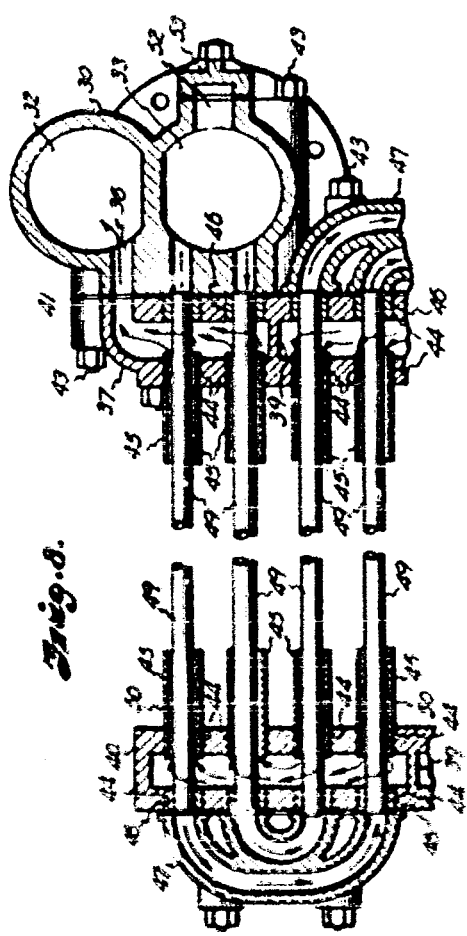
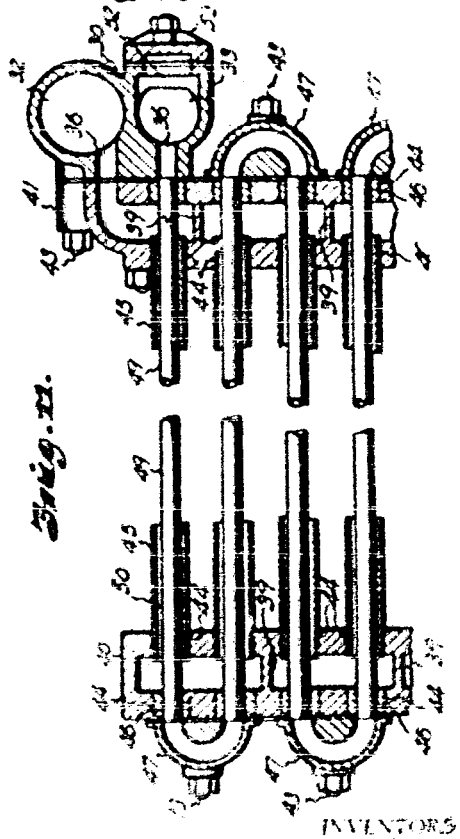

Patented Jan. 21, 1936

2,028,471

UNITED STATES PATENT OFFICE 2,028,471

APPARATUS FOR RECLAIMING WASTE HEAT

Emile J. Parent, Bloomfield, N. J., and John L. Krieg, Halifax, N. Y., assignors to Alco Products Incorporated, New York, N. Y., a corporation of Delaware Application August 2, 1934, Serial No. 728,082

8 Claims. (Cl. 257—237)

Our invention relates to a method and apparatus for reclaiming waste heat.

One object of our invention is to provide a method and apparatus for transferring heat from a constantly available waste hot liquid to a cooler liquid which will secure optimum recovery of the heat content of the waste liquid before it is discharged, while operating only at such times as hot, fresh liquid is needed.

It is a further object of this invention to provide a novel and efficient system for heat recovery which utilizes the natural phenomenon of fluid stratification by density as a means for insuring that only the hottest waste water will be circulated through the system.

It is another object of this invention to provide an efficient waste heat recovery system readily adaptable to any plant at low cost which is simple in construction, easily cleanable and in which the waste liquid as circulated contains a relatively low percentage of solid material.

A still further object of this invention is to provide a novel and efficient heat exchanger which effects a smooth unobstructed flow of the liquid flowing through it and which can be easily inspected and cleaned.

It is a further object of this invention to provide a novel heat exchanger whose capacity may be easily varied to meet differing volume requirements.

It is a further object of this invention to provide a heat exchanger having a high rate of heat transfer.

Other and further objects of this invention will appear from the following description and the appended claims.

In general, our invention contemplates the provision of a system employing a novel and efficient heat exchanger construction. The system is such that heat exchange takes place only when a demand for hot fresh liquid is required and only the hottest waste liquid is employed as a heating medium.

In the accompanying drawings which form part of the instant specification and are to be read in conjunction therewith and in which like reference numerals are used to indicate like parts in the various views:

Figure 1 is a perspective view, partly in section, showing a general arrangement of our waste heat reclaiming system.

Figure 2 is a plan view of a novel heat exchanger employed in our system.

Figure 3 is an end view of the construction shown in Figure 2.

Figure 4 is a sectional view taken on the line 4—4 of Figure 2.

Figure 5 is a sectional view taken on the line 5—5 of Figure 4.

Figure 6 is a sectional view taken on the line 6—6 of Figure 5.

Figure 7 is a sectional view taken on the line 7—7 of Figure 5.

Figure 8 is a fragmentary sectional view showing an enlarged view of a portion of the construction shown in Figure 4.

Figure 9 is a perspective view of the header used at one end of our construction.

Figure 10 is a perspective view of another form of header used in our construction.

Figure 11 is a sectional view similar to that in Figure 8, showing a modification of the invention.

Referring now to Figure 1 of the drawings, hot waste water from an industrial operation which is ordinarily passed to a drain for disposal is passed through line 1 into a sump tank 2. It is to be understood that any suitable waste fluid which contains sufficient heat may be employed. For convenience, we will refer to this liquid as hot waste water. The sump may be of any suitable construction. As shown in the drawings, it comprises a concrete tank which is provided with a transverse partition 3 having openings 4 near the bottom thereof forming a pair of compartments. An overflow stand pipe 5 is fitted in one of the compartments and it will be readily understood that the upper end of stand pipe 5 will govern the level of the liquid in both compartments of the sump tank 2. A valve 6, which may be operated from the ground level by extension rod 7, is provided for draining the tank for inspection, cleaning, and repair. Secured to the tank in any suitable manner is a deflector and surface strainer 8 which may be of any suitable type. A suction leg 9 is adapted to take suction from within said strainer 8. It will be noted that suction is taken from the upper level of the liquid in sump tank 2. While a demand for hot fresh liquid is latent, the hot waste water draining into sump tank 2 will gradually cool. As it cools, the colder liquid will sink to the bottom of the larger compartment and pass through holes 4 and overflow to the waste water outlet pipe 10, which goes to the sewer or other disposal point. The suction leg 9 terminates in the lower compartment of a priming tank 11 from which suction pump 12 is adapted to take suction. A motor 13 is fitted for operating the circulating pump 12. The pump discharges through pipe 14, through surge tank 15 of the automatic primer, through pipe 16, through heat exchanger 17, which may be of any suitable construction, though we prefer to use our novel heat exchanger which will be more fully hereinafter described. Due to the fact that it will require a heat exchanger having a high rate of heat exchange to operate our system, we consider the specific heat exchanger an integral part of the combination. After passing through the heat exchanger, the hot waste water leaves the same through pipe 19 which discharges into the overflow compartment of the sump tank, whence the hot waste water passes to be disposed of. The cold fresh liquid, which for convenience we will designate as water, comes from any suitable source through line 19 and passes through the heat exchanger, leaving it through line 20 in which is disposed a control device 21 of any suitable type such that, when liquid is flowing, a switch will be operated. Devices of this type are well known to the art and form no part of our invention; accordingly, we have shown the device 21 diagrammatically only. The outlet pipe 20 is fitted with a control valve 22. When the valve 22 is opened, flow will be induced through pipe 20 operating the control device 21 to start a magnetic switch shown diagrammatically at 23, to start the electric motor 18, which drives the pump.

The operation of our system will be clear from the foregoing description. Hot waste water is caused to stratify and suction taken from the hottest layers through an efficient heat exchanger which will be more fully hereinafter described. The arrangement of the sump is such that cold waste water which has given up some of its heat will not intermingle with the incoming hot waste water, or cause turbulence which will prevent the stratification desired.

Referring now to Figures 2, 3, 4, 5, 6, 7, and 8, which show the construction of our novel heat exchanger for use in our system, it will be seen that the heat exchanger consists essentially of a pair of castings 30 and 31. These castings are provided with passages forming manifolds 32, 33, 34, and 36. Ducts 36 extend from the manifolds to one side of the castings which is formed with a flattened surface. A series of headers 37 are adapted to be secured to the flattened sides of the manifolds. These headers are shown in Figure 10 and are cast with an integral foot member 38. The respective foot members are adapted to form the support for the heat exchanger. The headers are provided with partitions 39, adapted to divide them into compartments. Spaced from headers 37 are a plurality of corresponding headers 40, one of which is shown in perspective in Figure 9. These headers are similar to headers 37 in that they are provided with foot members 38 and partitions 39 dividing them into compartments. They differ from headers 37 in that they are not provided with lugs 41 and bolt openings 42 such as are provided in headers 37 for enabling them to be secured to the manifolds by stud bolts 43, as can readily be seen by reference to Figure 7. The headers 37 are provided with openings which are aligned with ducts 36 of the manifolds when the headers are in place. The headers 37 and 40 are also provided with openings 44 into which are expanded tubes 45, as can readily be seen by reference to the drawings.

Lodged within tubes 45 and disposed substantially concentric therewith are smaller tubes 46 which extend through tubes 45 and are adapted to form annular passageways 50 therewith. The ends of the tubes 46 extend through openings in the opposite walls of the headers 37 and 40 and are secured therein by means of suitable ferrules 46. The two upper and the two lower tubes 49 are aligned with ducts 36 of the manifolds 33 and 34. The ends of tubes 49 are connected by double pairs of the ends terminating in header 49 by return bends 47 as can readily be seen by reference to the drawings and particularly to Figure 8. It will be observed that return bends 47 are such that two pair of tubes are connected to two pair of adjacent tubes. In the form of the invention shown in Figure 11, the construction is such that the manifolds 33 and 34 are provided with only one pair of ducts 36 and the return bends are arranged to connect one pair of tubes with its next lower adjacent pair of tubes. It will be readily seen that the principle of the invention is the same, but in the form shown in Figure 3, the flow is through four tubes (in other words, the flow is "four-to-carry"), while in Figure 11 the flow is through two tubes (in other words, the flow is "two-to-carry"). It will be readily understood that, if desired, the flow may be made through any number of tubes in parallel without departing from the spirit of our invention.

The ends of tubes 49 which terminate in header 37 between the manifolds 33 and 34 are connected by means of return bends 47, similar to the manner in which the ends of the tubes terminating in header 40 are connected. It will also be understood that the height of headers 37 and 40 may be of any suitable distance so that a number of return bends 47 may be placed between manifolds 33 and 34 if desired.

It will be observed that the tier of pairs of tubes extending between respective headers 37 and 40 form, as it were, a series of independent heat exchangers, all feeding from and emptying to common intake and eduction manifolds. The castings 30 and 31 may be used to assemble any suitable number of sub-heat exchangers formed by headers 37 and 40 and their respective tubes. If it should be desired to employ a smaller or larger heat exchange surface, the induction and eduction manifolds for the heating medium and fluid to be heated may be blanked off by cover plates 51 as can readily be seen by reference to Figures 5 and 6. Extending longitudinally of manifolds 33 and 34 we provide manhole slots 52, closed by suitable cover plates 53, as can readily be seen by reference to Figure 7.

The construction, when assembled, will rest upon feet 38 of the headers 37 and 40. Suitable lagging 54 may be provided around the heat exchanger bank to prevent a loss of heat by radiation. It will be seen that, in the type of heat exchanger in which the flow is carried by four tubes, the rate of flow can be multiplied by the number of sub-heat exchanger units which are connected to the intake and eduction manifolds. An extremely rapid rate of flow and hence rate of heat exchange is thus obtained. The construction is extremely flexible and can be varied to suit varying requirements in a simple, convenient, and expeditious manner.

In operation, the flow of the heating medium and the liquid to be heated is counterflow. Thus the hot waste water may enter either manifold 32 or 33.

As shown in Figure 1, the hot waste water enters manifold 33, passes through ducts 36, through tubes 49, through return bends 47, thence through other tubes 49 and return bends, to manifold 34. The cold fresh water in Figure 1 enters manifold 32, passes through its ducts 36 to the lower compartments of the headers 31, through tubes 49, in which the cold fresh water flows in the annular passageways 50 formed by the exterior surfaces of tubes 49 and the interior surfaces of tubes 48, to respective compartments in headers 46. The cold fresh water then returns through similar passageways 50 to the next higher compartments in headers 37, finally terminating in the upper compartments of headers 37, thence through ducts 38 to the upper manifold 33, through the hot fresh water outlet pipe 29.

It will be observed that either medium may flow through pipes 49 and likewise that either medium may be introduced at the top or the bottom. The only requirement is that the introduction of the fluids be such that the direction of flow is counterflow in order to provide for an efficient and rapid heat exchange.

It will be seen that we have accomplished the objects of our invention. We have provided a novel method and apparatus for transferring heat from a constantly available supply of waste heat liquid. The hottest liquid will be that used for supplying heat to the medium to be heated. The rate of heat exchange is extremely high. The construction is easily cleanable and the amount of heat exchange surface can be varied within certain limits in an expeditious and convenient manner. It is desirable to have the hot waste liquid flow through tubes 49 inasmuch as these tubes can be more easily cleaned than the passageways 50. Suitable strainers may be provided, if desired, in addition to the surface strainer 8 so that the hot waste fluid will have a low percentage of solid material. It will be apparent that the construction can be easily repaired and tubes easily replaced.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown, and described.

Having thus described our invention, what we claim is:

1. A heat exchanger comprising in combination a first manifold, a first header communicating therewith, a second header, tubes providing communication between said headers and a second manifold communicating with said first header.

2. A heat exchanger comprising in combination a first manifold, a plurality of headers communicating therewith, headers spaced from said first headers, tubes providing communication between said headers, and a second manifold communicating with said first headers.

3. A heat exchanger comprising in combination a manifold, a plurality of headers communicating therewith, headers spaced from said first headers, tubes providing communication between said headers, a second manifold, tubes disposed within said first tubes and communicating with said second manifold, a third manifold communicating with one of said headers and a fourth manifold communicating with said second header, said respective manifolds forming the cool fluid induction, heating fluid outlet, heated fluid outlet and the heating fluid inlet.

4. A heat exchanger comprising a first manifold having a fluid inlet conduit and a fluid outlet conduit, a second manifold having a fluid inlet conduit and a fluid outlet conduit, a header having at least three chambers connected to said conduits, a second header having at least two chambers, tube means placing the first chamber of the first header in communication with the first chamber of the second header, tube means placing the first chamber of the second header in communication with the second chamber of the first header, tube means placing the second chamber of the first header in communication with the second chamber of the second header, tube means placing the second chamber of the second header in communication with the last chamber of the first header, separate tube means disposed within the aforesaid tube means and passing through said headers, return bends associated with each header and so constructed and arranged as to establish a continuous path through said inner tube means, passages formed in said first manifold and first header adapted to place the inlet conduit of said first manifold in communication with the first chamber of said first header, and the outlet conduit of said first manifold in communication with one end of said inner tube means and passages formed in said second manifold and first header adapted to place the outlet conduit of said second manifold in communication with the last chamber of said first header and the inlet conduit of said second manifold in communication with the other end of said inner tube means.

5. A heat exchanger comprising a first manifold and a second manifold, each having an inlet and an eduction conduit, separate banks of serially connected tubes communicating at one end with the inlet conduit of the first manifold and at the other end with the eduction conduit of the second manifold, other banks of serially connected tubes communicating at one end with the eduction conduit of the first manifold and at the other end with the inlet conduit of the second manifold, the tubes of said latter banks being arranged within the tubes of said first banks whereby an annular passageway is formed.

6. A heat exchanger as defined by claim 5 in which each tube bank has at least two separate passageways.

7. A heat exchanger as defined by claim 5 in which each tube bank has at least four separate passageways.

8. A heat exchanger comprising a pair of superposed manifolds, a first group of headers individually and detachably connected to said manifolds, a second group of headers, tube banks connecting the first mentioned headers with the second mentioned headers in pairs, the tube units in each bank consisting of a pair of substantially concentrically arranged, fluid conducting tubes and means associated with the headers forming supports for the heat exchanger.

EMILE J. PARENT.
JOHN L. KRIEG.